United States Patent [19]
Doodson

[11] Patent Number: 5,913,419
[45] Date of Patent: Jun. 22, 1999

[54] COMBINATION OF A SUPPORT FOR A DISC-SHAPED RECORDING MEDIUM AND A HOLDER FOR THE SUPPORT

[75] Inventor: Pieter J. Doodson, Eindhoven, Netherlands

[73] Assignee: U.S. Philips Corporation, New York, N.Y.

[21] Appl. No.: 08/601,896

[22] Filed: Feb. 15, 1996

[30] Foreign Application Priority Data

May 29, 1995 [EP] European Pat. Off. .............. 95201395

[51] Int. Cl.⁶ .................................................. B65D 85/30
[52] U.S. Cl. ........................ 206/308.1; 206/232; 206/312
[58] Field of Search ................. 206/307, 307.1, 206/308.1, 309, 311, 312, 313, 232

[56] References Cited

U.S. PATENT DOCUMENTS

| | | | |
|---|---|---|---|
| 5,093,823 | 3/1992 | Ouwerkerk et al. ................. | 206/308.1 |
| 5,263,581 | 11/1993 | Rosen ................................. | 206/308.1 |
| 5,370,224 | 12/1994 | Karakane et al. .................... | 206/309 |
| 5,392,913 | 2/1995 | Merrick .............................. | 206/308.1 |
| 5,396,987 | 3/1995 | Temple et al. ...................... | 206/312 |
| 5,522,500 | 6/1996 | Mori .................................. | 206/308.1 |

FOREIGN PATENT DOCUMENTS

| | | |
|---|---|---|
| 0188663A2 | 7/1986 | European Pat. Off. . |
| 0315255A1 | 5/1989 | European Pat. Off. . |
| 2272685 | 5/1994 | United Kingdom ............ 206/307 |

*Primary Examiner*—Paul T. Sewell
*Assistant Examiner*—Nhan T. Lam
*Attorney, Agent, or Firm*—Steven S. Rubin

[57] ABSTRACT

A combination of a support for a disc-shaped recording medium and a holder for the support. The support is a box-shaped cartridge having two parallel rigid main walls. The main walls have facing inner surfaces which bound a space for receiving the recording medium. At least one of the main walls has a window to provide optical access to the recording medium. The holder includes a wall portion for covering the window in a holding position of the cartridge on the holder.

13 Claims, 3 Drawing Sheets

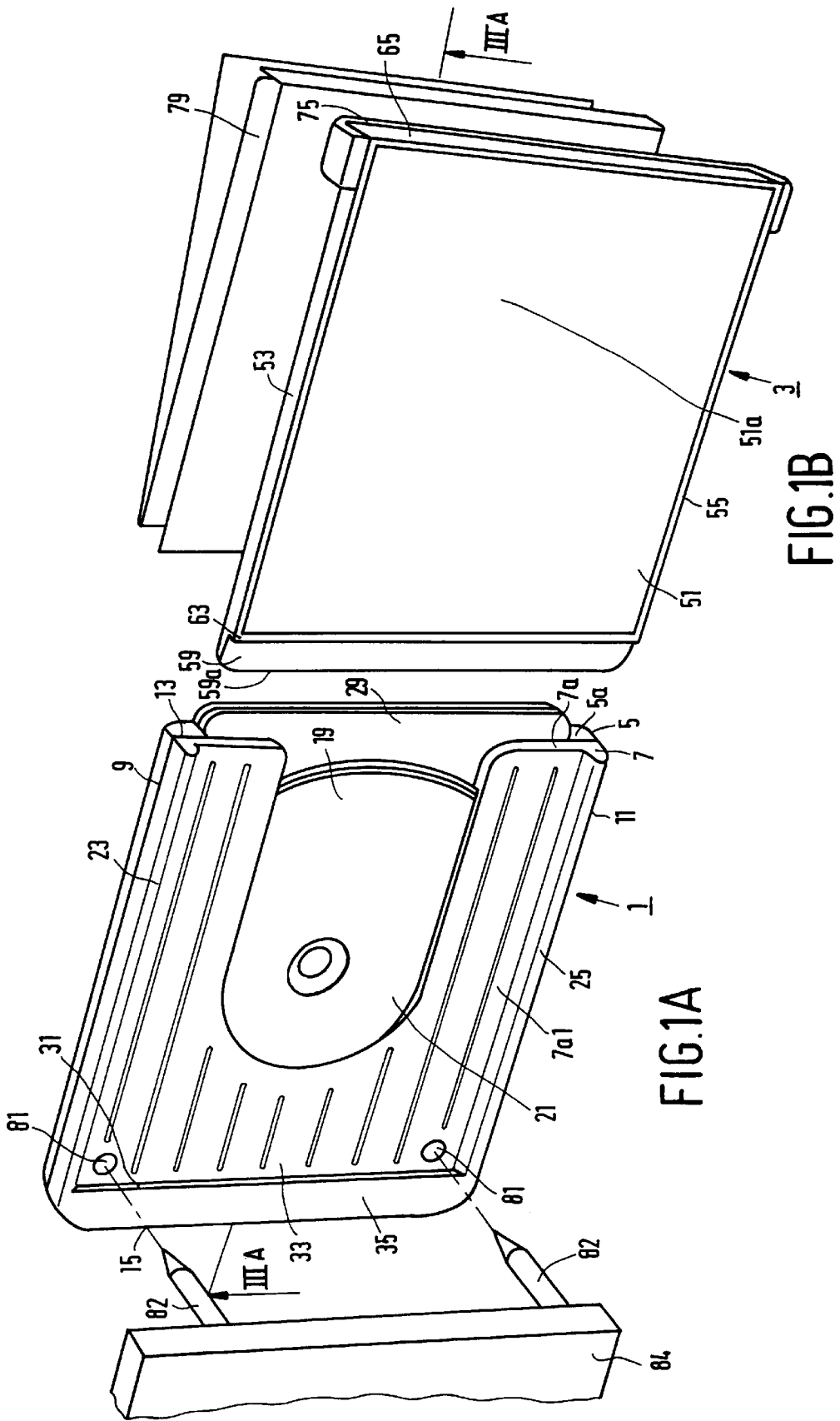

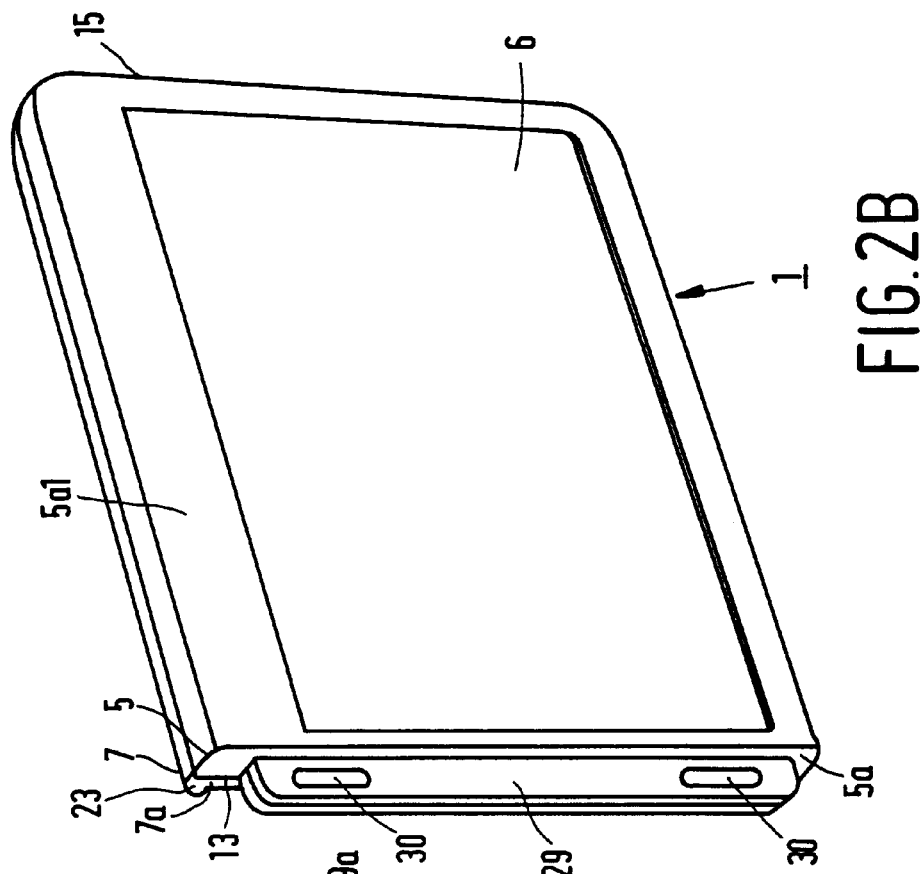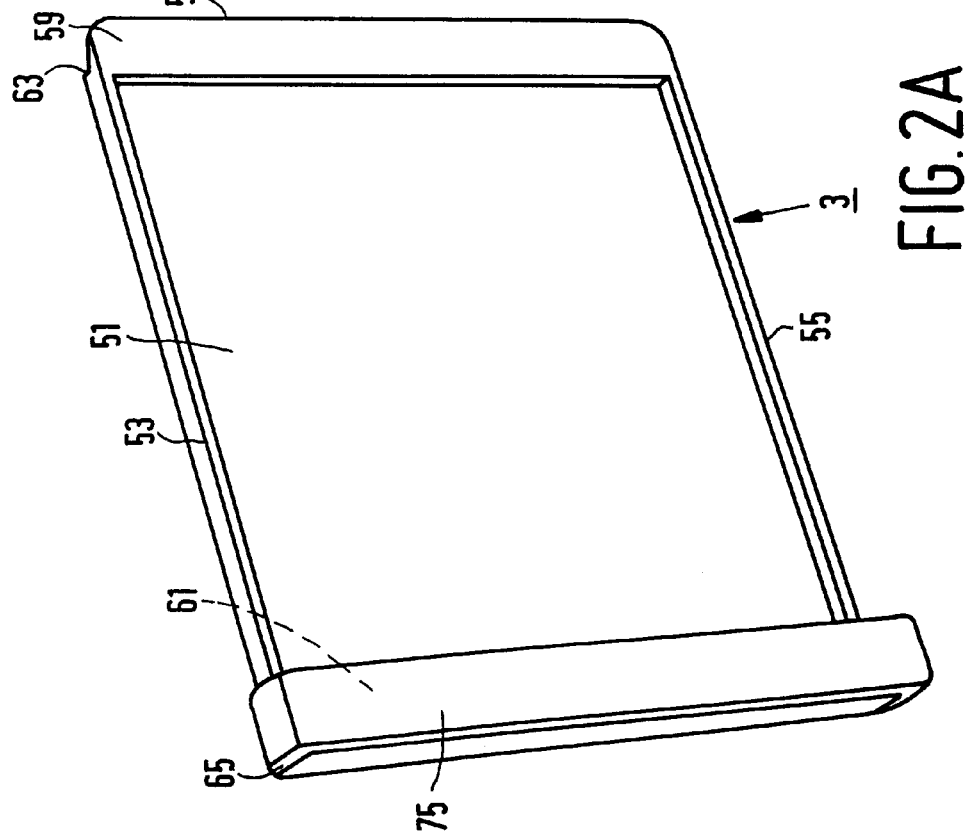

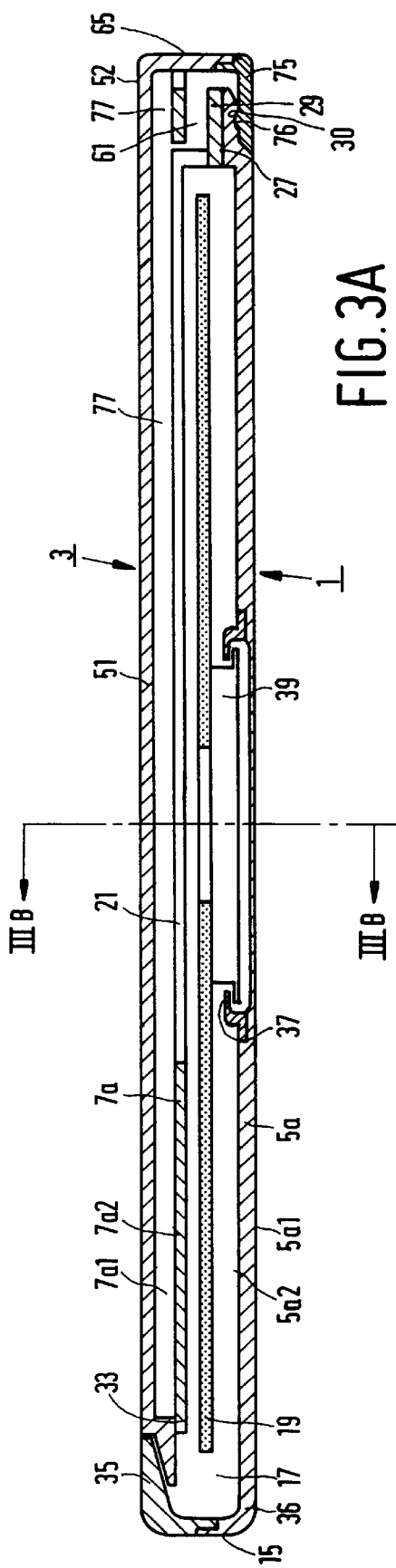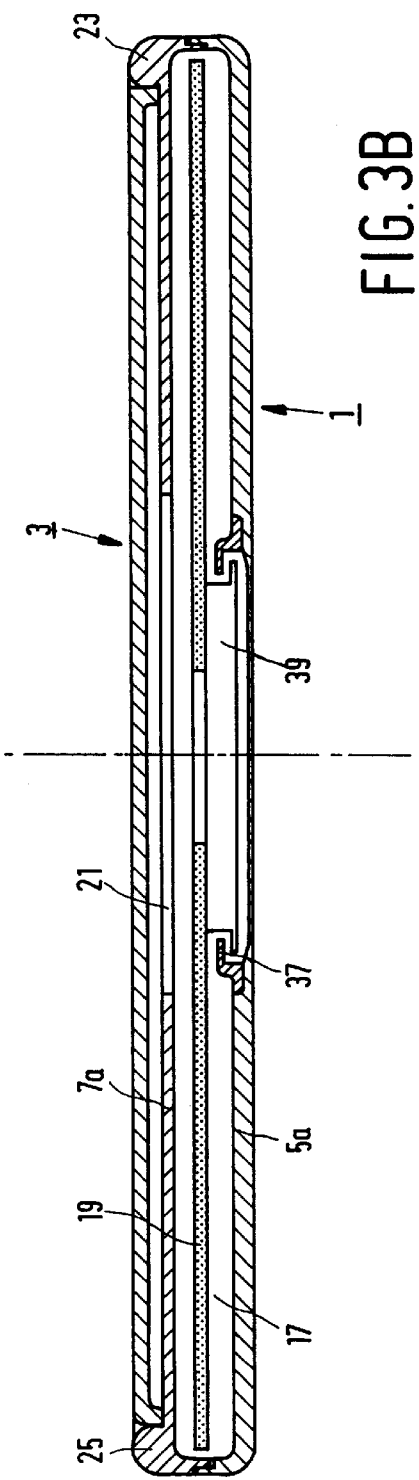

COMBINATION OF A SUPPORT FOR A DISC-SHAPED RECORDING MEDIUM AND A HOLDER FOR THE SUPPORT

BACKGROUND OF THE INVENTION

The invention relates to a combination of a support for a disc-shaped recording medium and a holder for the support.

Such a combination is known from EP-A-0,188,663. The known combination comprises a tray for holding and supporting a round information disc, particularly a Compact Disc, and a storage case having a lid and adapted to store the tray. The tray has a retaining rim, a holding space and holding means for holding an information disc present in the holding space. The tray can be used as an element for insertion into an optical scanning device having a mechanism suitable for releasing an information disc held in the holding space. When the known combination is used an information disc need not be touched by hand in order to be transferred from the storage case into the scanning device or from the scanning device into the storage case.

A disadvantage of the known combination is the comparatively intricate manner in which the tray can be fitted into the storage case or removed from the storage case. For these operations it is also necessary to manipulate the lid of the storage case, which is inconvenient, particularly if the tray is being held in the hand. Another disadvantage is that in a situation in which the tray is outside the storage case and holds an information disc this disc is not protected against soiling by dust and other contaminants. A further disadvantage is that the tray can cooperate only with playing devices comprising means for releasing the information disc from the holding means.

SUMMARY OF THE INVENTION

It is an object of the invention to provide a combination of a support for a disc-shaped recording medium and a holder for the support, which is user-friendly and which also provides an effective protection against touching and soiling of the recording medium.

The combination in accordance with the invention is characterised in that the support is a box-shaped cartridge having two parallel rigid main walls, which main walls have outer surfaces, which are remote from each other, and inner surfaces, which face each other, which inner surfaces bound a space for receiving the recording medium, at least one of the main walls having a window, and the holder comprising a wall portion for covering the window in a holding position of the cartridge on the holder. Once a disc-shaped recording medium such as an optical disc, for example a CD or a variant thereof, has been loaded into the cartridge the recording medium is protected against touching and soiling. The window which serves to provide access to the recording medium for the purpose of recording and/or reading is formed by an aperture, preferably a narrow substantially elongate aperture, in a main wall. In the holding position, i.e. when the cartridge is attached to the holder, the window is covered completely. The cartridge can be brought into or out of the holding position by simple movements of the cartridge and the holder relative to one another. Thus, a disc-shaped recording medium can be transferred from a storage condition to a scanning device without the medium itself being touched, in a simple manner, which is safe for the recording medium, by detaching the cartridge from the holder and bringing it into contact with the scanning device. The scanning device only needs to have a simple loading and unloading mechanism because no provisions are necessary to release the recording medium from some locked condition. The space in the cartridge is dimensioned so as to allow the recording medium to rotate freely in the cartridge during scanning.

It is to be noted that U.S. Pat. No. 5,370,227 describes a disc holder comprising a thin plate-shaped base and a flexible plate attached to the base, which together form a sleeve for inserting a disc record. An inserted disc record is held in the sleeve by friction. For this purpose the disc record is in contact with portions of the sleeve along its periphery. The disc holder can be stored in a housing. If the disc record is to be played the disc holder should first be slid out of the housing, after which the disc record should be slid out of the disc holder. The disc holder may alternatively form part of a set of disc holders which are movable relative to one another. In this case the disc record should also be slid out of the disc holder in order to be played.

An embodiment of the combination in accordance with the invention is characterised in that at its outer surface a main wall of the cartridge has parallel cartridge edges which extend between a front side and a rear side of the cartridge and the holder has parallel holder edges which extend between a front side and a rear side of the holder, which cartridge edges and holder edges cooperate with each other when the cartridge is moved into and out of the holding position, retaining means being provided to hold the cartridge in the holding position. By holding the cartridge with one hand and the holder with the other hand the cartridge and the holder can be united or separated with a simple sliding movements. Said edges guarantee a smooth and reliable guiding and positioning of the cartridge and the holder relative to one another.

An embodiment of the combination in accordance with the invention is characterised in that the cartridge edges are formed by wall portions of ridges on the side walls of the cartridge, which wall portions are raised relative to the outer surfaces, and the holder edges are side walls of the holder. In this embodiment guiding and positioning means are obtained in a practical and simple manner.

An embodiment of the combination in accordance with the invention is characterised in that the retaining means comprise a fin situated at the front side of the holder and extending parallel to the wall portion, and a slot situated near the rear side of the cartridge and extending parallel to a main wall, the fin being in clamping engagement with the slot in the holding position. The fin is engageable in and disengageable from the slot by simply moving the cartridge and the holder relative to one another. The fin is preferably wedge-shaped, in such a manner that a clamping force occurs which increases as the fin is inserted further into the slot. This clamping force can be obtained simply by means of the cartridge portions which bound the slot. These portions may serve as means for holding or gripping the cartridge.

An embodiment of the combination in accordance with the invention is characterised in that the retaining means comprise a tongue, which is situated at the front side of the cartridge and extending parallel to a main wall, and a slot, which is situated near the rear side of the holder and which extends parallel to the wall portion, means being provided to hold the tongue in the slot in the holding position. The tongue is engageable in and disengageable from the slot by simply moving the cartridge and the holder relative to one another. The tongue has preferably recesses which cooperate with projections in the slot after the tongue has engaged the slot. The slot may be bounded by holder portions which also serve as a holding means for the holder.

An embodiment of the combination in accordance with the invention is characterised in that the cartridge basically comprises two separate cartridge sections which each comprise a main wall and which are secured to one another. The main walls can be manufactured simply, for example by injection-moulding, from a suitable material, particularly a plastics such as polystyrene or acrylonitrile-butadiene-styrene (ABS) and are provided with integrated side walls, the side walls of one cartridge section engaging with the side walls of the other cartridge section. After having been loaded with a recording medium the cartridge sections may be permanently secured to one another, preferably by means of an adhesive. If desired, the sections may also be connected to one another in a detachable manner, for example by a snap connection. An advantage of a detachable connection is that the cartridge can also be loaded with a recording medium after its manufacture or that a recording medium present in the cartridge can be replaced by another one.

An embodiment of the combination in accordance with the invention is characterised in that the wall portion of the holder forms part of a wall of at least substantially the same dimensions as a main wall of the cartridge. In the holding position of the present combination the outlines of the holder and the outlines of the cartridge coincide with one another. Preferably, this combination is further characterised in that the holder has an insert space at a side of the wall which faces the cartridge in the holding position. The insert space may be provided with an insert or document with pictorial and/or text information which relates to the recording medium and is relevant to the user. Preferably, the wall is optically transparent to enable the information to be also observed from the outside.

An embodiment of the combination in accordance with the invention is characterised in that the holder is a plastics body. This holder can be manufactured simply, for example by injection-moulding. A suitable plastics is polystyrene.

The invention further relates to a combination as defined in the Claims and a disc-shaped recording medium which is retained with clearance between the main walls of the cartridge.

The invention further relates to a support as defined in the Claims, for use in the combination in accordance with the invention.

The invention moreover relates to a holder as defined in the Claims, for use in the combination in accordance with the invention.

The invention further relates to a system comprising a combination as defined in the Claims and a scanning apparatus, the cartridge of the combination having locating apertures and the scanning apparatus having locating pins for cooperation with the locating apertures.

BRIEF DESCRIPTION OF THE DRAWINGS

The invention will now be described in more detail, by way of example, with reference to the drawings, in which FIG. 1A is a perspective rear view of an embodiment of the cartridge in accordance with the invention, FIG. 1B is a perspective front view of an embodiment of the holder in accordance with the invention, FIG. 2A is a perspective rear view of the holder shown in FIG. 1B, FIG. 2B is a perspective front view of the cartridge shown in FIG. 1A, FIG. 3A is a cross-sectional view taken on the line IIIA—IIIA in FIGS. 1A and 1B, showing an embodiment of the combination in accordance with the invention, which combination includes the cartridge shown in FIGS. 1A and 2B and the holder shown in FIGS. 1B and 2A, and FIG. 3B is a cross-sectional view taken on the line IIIB—IIIB in FIG. 3A, showing the combination in accordance with FIG. 3A.

DESCRIPTION OF THE PREFERRED EMBODIMENTS

The embodiment of the combination in accordance with the invention shown in the Figures comprises a support 1 and a holder 3. The support 1 is constructed as a box-shaped cartridge and will be referred hereinafter as the cartridge 1. The cartridge 1 comprises two cartridge sections 5 and 7, each having a main wall 5a and 7a, respectively. The main walls 5a and 7a are made of a suitable plastics, in the present example polystyrene, preferably by injection-moulding, to form an inherently rigid cartridge. The main walls 5a and 7a, which have outer surfaces 5a1 and 7a1, respectively, which are remote from each other, and inner surfaces 5a2 and 7a2, respectively, which face each other, bound a space 17 for receiving a disc-shaped inherently rigid recording medium 19, particularly an optically scanned information carrier, such as a Compact Disc. At its outer surface 5a1 the main wall 5a has a recess 6 for an information label. The main wall 7a has a window 21 formed by an opening in the main wall 7a and intended to provide access to the recording medium 19 for the purpose of recording and/or reading. If desired, for example when a recording medium which can be scanned at two sides is used, the main wall 5a may also be provided with a window. At its outer surface 7a1 the main wall 7a further has two cartridge edges 23 and 25 in the form of ridges which extend from the front side 13 to the rear side 15. The cartridge edges 23 and 25 serve for guiding and/or positioning the holder 3 in a holding position, in which the cartridge 1 is held by the holder 3.

As is shown, the cartridge sections 5 and 7 may be permanently secured to one another at their common contact surface 27, for example by an adhesive, so that the recording medium 19 in the cartridge 1 cannot be removed. Alternatively, the cartridge 1 may be provided with means for detachably securing the cartridge sections 5 and 7 to one another, for example by providing a snap-in and snap-out construction, in which case the recording medium 19 can be removed from the cartridge and may be replaced by another one. The space 17 in which the recording medium 19 is situated is created by forming an inner portion which recedes at least relative to the contact surface 27. In the present example both inner surfaces 5a2 and 7a2 are situated at receding portions.

For cooperation with the holder 3 the cartridge 1 has a tongue 29 at the front side 13, which tongue extends parallel to the main walls 5a and 7a, forms part of at least one of the main walls, in the present example both main walls 5a and 7a, and has one or more, in the present example two, recesses 30. For the same purpose the cartridge 1 has a slot 31 at the rear side 15, which slot extends parallel to the main wall 7a and transversely to the cartridge edges 23 and 25. The slot 31 is bounded at one side by a central portion 33 of the main wall 7a and at the other side by a raised portion 35 of the main wall 7a. The raised portion 35 together with a facing strip portion 36 of the main wall 5a forms a grip for the cartridge 1.

Clamping means may be provided to clamp the recording medium 19 onto a turntable. In the present example the main wall 5a carries in its central part a clamping element 39 comprising a ferromagnetic disc which is retained with clearance by raised rim portions or a continuous rim 37. If the turntable is provided with a permanent magnet the recording medium will be clamped between the clamping element 39 and the turntable in a scanning position.

The holder 3 has a rigid wall 51 with two parallel holder edges 53 and 55, which extend from a front side 63 to a location near a rear side 65. The holder 3 is made of a suitable plastics, for example a transparent plastics, such as polystyrene, preferably by injection-moulding.

For its cooperation with the cartridge 1 the holder 3 has a fin 59 at its front side 63, which fin extends parallel to the wall 51, and a slot 61 at its rear side 65. The fin 59, which has a free end portion 59a, is wedge-shaped, its thickness decreasing gradually towards the free end portion 59a. The slot 61 extends between the wall 51 and a strip 75 parallel to the wall 51 in one direction and between the two edges 53 and 55 in the other direction. The strip 75, which is secured to the holder edges 53 and 55 and which at a side facing the wall 51 has one or more, in the present example two, projections 76, together with a facing strip portion 52 of the wall 51, forms a grip for the holder 3. In the present example an insert space 77 is provided at the side of the holder 3 where the strip 75 is situated, which space serves to accommodate an insert 79 in the form of a leaflet and/or a booklet, which insert may contain information relating to the recording medium 19. Preferably, the wall 51 is transparent to allow the insert 79 to be observed through the wall.

The cartridge 1 is suitable for cooperation with a scanning apparatus such as a CD player. Depending on the construction of the scanning apparatus the cartridge 1 can be placed into or onto the scanning apparatus so as to transfer the recording medium 19 to the turntable for the purpose of scanning the recording medium. In the situation in which the medium is supported by the turntable it extends through the window and the recording medium is wholly clear of the cartridge. A scanning device in the apparatus, particularly an optical scanning device, can scan the medium 19 via the window 21. For accurately positioning the cartridge 1 in a scanning apparatus the cartridge 1 in the present example has locating apertures 81 for cooperation with locating pins 82 of the scanning apparatus, which is shown diagrammatically and is referenced 84 in FIG. 1.

In principle, the scanning apparatus may be a known apparatus, for example of the type as disclosed in EP-A 0,315,255, which comprises a known scanning device.

When the cartridge 1 is situated outside a scanning apparatus the recording medium 19 can be protected effectively against touching and soiling by coupling the cartridge 1 to the holder 3. For this purpose the cartridge 1 and the holder 3 should be moved towards one another from the position shown in FIGS. 1A and 1B or in FIGS. 2A and 2B, as a result of which at a given instant the holder edges 53 and 55 engage between the cartridge edges 23 and 25, after which the cartridge 1 and the holder 3 are guided relative to one another until the fin 59 of the holder 3 is in clamping engagement in the slot 31 in the cartridge 1 and the tongue 29 of the cartridge is in clamping engagement in the slot 61 in the holder 3. This position, i.e. the holding position of the cartridge 1 on the holder 3 is shown in FIGS. 3A and 3B. In the holding position the window 21 of the cartridge 1 is wholly covered and closed by a wall portion 51a of the wall 51 of the holder 3. The design of the combination in accordance with the invention makes it possible to obtain a cartridge 1 and a holder 3 of such dimensions that in the assembled condition, i.e. in the holding position, the external dimensions of the combination are equal to those of the commercially available storage cases for CDs in accordance with the afore-mentioned EP-A 0,188,663. The external dimensions of these storage cases are 142 mm×125 mm×10.4 mm. To detach the cartridge 1 from the holder 3 the cartridge 1 and the holder 3 merely have to be slid apart with a small force in a direction parallel to the cartridge edges 23 and 25.

It is to be noted that the invention is not limited to the exemplary embodiment shown herein. Various modifications are possible within the scope of the invention. For example, the holder may be provided with two parallel wall portions if the main walls of the cartridge each have a window.

I claim:

1. A combination of a support for a disc-shaped recording medium and a holder for the support, for use with a device which, in operational engagement with said disc-shaped recording medium, rotates said disc-shaped recording medium, characterized in that the support is a cartridge having two parallel rigid main walls, which main walls have outer surfaces, which are remote from each other, and inner surfaces, which face each other, said cartridge comprising means for holding said walls apart from one another so that said inner surfaces bound a space for receiving the recording medium, said space being dimensioned so as to allow the recording medium to rotate freely during operative engagement with said device, at least one of the main walls having a window, and the holder being removably insertable into the cartridge thereby defining at least two distinct operative arrangements between said holder and said cartridge, one of said operative arrangements being a holding position, which occurs when said holder and said cartridge are combined into one unit, a second operative arrangement being an operational position which occurs when said holder and said cartridge are separated into distinct units; and said holder comprising a wall portion for covering the window of the cartridge on the holder while said cartridge and said holder are in said holding position.

2. A combination as claimed in claim 1, characterised in that at its outer surface a main wall of the cartridge has parallel cartridge edges which extend between a front side and a rear side of the cartridge and the holder has parallel holder edges which extend between a front side and a rear side of the holder, which cartridge edges and holder edges cooperate with each other when the cartridge is moved into and out of the holding position, retaining means being provided to hold the cartridge in the holding position.

3. A combination as claimed in claim 2, characterised in that the cartridge edges are formed by wall portions of ridges on the side walls of the cartridge, which wall portions are raised relative to the outer surfaces, and the holder edges are side walls of the holder.

4. A combination as claimed in claim 2, characterised in that the retaining means comprise a fin situated at the front side of the holder and extending parallel to the wall portion, and a slot situated near the rear side of the cartridge and extending parallel to a main wall, the fin being in clamping engagement with the slot in the holding position.

5. A combination of a support for a disc-shaped recording medium and a holder for the support, for use with a device which, in operational engagement with said disc-shaped recording medium, rotates said disc-shaped recording medium, characterized in that the support is a cartridge having two parallel rigid main walls, which main walls have outer surfaces, which are remote from each other, and inner surfaces, which face each other, said cartridge comprising means for holding said walls apart from one another so that said inner surfaces bound a space for receiving the recording medium, said space being dimensioned so as to allow the recording medium to rotate freely during operative engagement with said device, at least one of the main walls having a window, and the holder being removably insertable into the cartridge to achieve a holding position, and said holder comprising a wall portion for covering the window in a holding position of the cartridge on the holder;

at an outer surface of said combination, a main wall of the cartridge has parallel cartridge edges which extend between a front side and a rear side of the cartridge and the holder has parallel holder edges which extend between a front side and a rear side of the holder, which cartridge edges and holder edges cooperate with each other when the cartridge is moved into and out of the holding position, retaining means being provided to hold the cartridge in the holding position;

the retaining means comprise a tongue, which is situated at the front side of the cartridge and extending parallel to a main wall, and a slot, which is situated near the rear side of the holder and which extends parallel to the wall portion, means being provided to hold the tongue in the slot in the holding position.

6. A combination as claimed in claim 1, characterised in that the cartridge basically comprises two separate cartridge sections which each comprise a main wall and which are secured to one another.

7. A combination as claimed in claim 6, characterised in that the cartridge sections are secured to one another by means of an adhesive.

8. A combination as claimed in claim 6, characterised in that the cartridge sections are detachably secured to one another.

9. A combination as claimed in claim 1, characterised in that the wall portion of the holder forms part of a wall of at least substantially the same dimensions as a main wall of the cartridge.

10. A combination as claimed in claim 9, characterised in that the holder has an insert space at a side of the wall which faces the cartridge in the holding position.

11. A combination as claimed in claim 1, characterised in that the holder is a plastics body.

12. An assembly of the combination as claimed in claim 1 and a disc-shaped recording medium which is retained with clearance between the main walls of the cartridge.

13. A system including:

a combination of a support for a disc-shaped recording medium and a holder for the support, for use with a device which, in operational engagement with said disc-shaped recording medium, rotates said disc-shaped recording medium, characterized in that the support is a cartridge having two parallel rigid main walls, which main walls have outer surfaces, which are remote from each other, and inner surfaces, which face each other, said cartridge comprising means for holding said walls apart from one another so that said inner surfaces bound a space for receiving the recording medium, said space being dimensioned so as to allow the recording medium to rotate freely during operative engagement with said device, at least one of the main walls having a window, and the holder being removably insertable into the cartridge to achieve a holding position, and said holder comprising a wall portion for covering the window in a holding position of the cartridge on the holder; and a scanning apparatus, the cartridge of the combination having locating apertures and the scanning apparatus having locating pins for cooperation with the locating apertures.

\* \* \* \* \*